United States Patent [19]
Shima et al.

[11] Patent Number: 6,104,498
[45] Date of Patent: Aug. 15, 2000

[54] IMAGE INFORMATION PRINT SYSTEM AND METHOD

[75] Inventors: Toshihiro Shima; Kazuhiko Iida; Hikonosuke Uwai, all of Nagano, Japan

[73] Assignee: Seiko Epson Corporation, Tokyo, Japan

[21] Appl. No.: 08/758,456

[22] Filed: Nov. 29, 1996

[30] Foreign Application Priority Data

Nov. 30, 1995 [JP] Japan ................................. 7-312695
Nov. 18, 1996 [JP] Japan ................................. 8-306372

[51] Int. Cl.[7] ........................................... G06F 3/12
[52] U.S. Cl. .................. 358/1.14; 358/1.12; 358/1.15; 358/1.16; 271/65; 271/301
[58] Field of Search .................... 395/114, 112, 395/115, 116; 358/296, 404, 442, 444, 460, 468, 1.12, 1.15, 1.16; 271/65, 301

[56] References Cited

U.S. PATENT DOCUMENTS

| 5,241,397 | 8/1993 | Yamada ................................. 358/296 |
| 5,331,547 | 7/1994 | Laszlo ................................. 364/413.01 |
| 5,715,379 | 2/1998 | Pavlovic et al. ................................. 395/112 |
| 5,727,220 | 3/1998 | Hohensee et al. ................................. 395/774 |
| 5,852,676 | 12/1998 | Lazar ................................. 382/173 |

FOREIGN PATENT DOCUMENTS

| 0 653 700 A1 | 5/1995 | European Pat. Off. ................ 395/114 |
| 0 659 570 | 6/1995 | European Pat. Off. ............ B41J 5/30 |
| 5-107852 | 4/1993 | Japan ................................. 395/114 |
| 92/11596 | 6/1992 | WIPO ................................. G06F 3/12 |

*Primary Examiner*—Mark K. Zimmerman
*Assistant Examiner*—Lance W. Sealey
*Attorney, Agent, or Firm*—Sughrue, Mion, Zinn, Macpeak & Seas, PLLC

[57] ABSTRACT

An image information print system has a reception task for receiving data containing print information input from a host computer, a job language interpretation task for interpreting the data, a print data analysis task for converting the format of the print information to prepare intermediate print information, memory means for storing the data and the intermediate print information, and a print management task for issuing a print execution instruction based on print specifications of print information contained in the data according to interpretation of the job language interpretation task and converting the intermediate print information into bit image data and executing print based on the print execution instruction.

19 Claims, 13 Drawing Sheets

EXAMPLE 1: 1, 2, 3, 4, , , , N

EXAMPLE 2: Js { M { 1, 2, 3, 4, , , , N } } Je

EXAMPLE 3: Js { M {1, 2, 3, 4, , , , Na }, { 1, 2, 3, 4, , , , Nb }, , , , { 1, 2, 3, 4, , , , Nx } } Je

EXAMPLE 4: Js { Js { M {1, 2, 3, 4, , , , Na } } Je, , , , Js { M { 1, 2, 3, 4, , , , Nx } } Je } Je

EXAMPLE 5: M { 1, 2, 3, 4, , , , N } M

EXAMPLE 6: M { { 1, 2, 3, 4, , , , Na }, { 1, 2, 3, 4, , , , Nb }, , , , { 1, 2, 3, 4, , , , Nx } } M

IMAGE INFORMATION PRINT SYSTEM AND METHOD

BACKGROUND OF THE INVENTION

1. Field of the Invention

This invention relates to an image information print system such as a printer and an image information print method for processing print information input to the print system and printing on storage media.

2. Description of the Related Art

A conventional printer repeats steps of receiving print information sent from a host computer, storing it in a predetermined location, converting the format of the print information to generate intermediate print information, storing the intermediate print information in a predetermined location, converting the intermediate print information into image data, storing the image data in a predetermined location, and printing the stored image data in the storage order in page units. Therefore, to test print of only the first page, it is necessary to input such a command to the host computer and transmit print information of only the first page to the printer. To print more than one copy of the same document, print information of such a duplicate portion needs to be transmitted from the host computer. For example, to use a reverse order print mode, print information needs to be transmitted in the reverse order from the host computer.

In any way, how the printer prints depends completely on how the print information is transmitted by the host computer, and changing the print specifications such as reversing the print order or performing a test print of only the first page is not possible after the print information is transmitted.

Some conventional printers are provided with a face-up paper discharge unit, a face-down paper discharge unit, a sorter paper discharge unit, etc., as a paper discharge unit.

The face-down paper discharge unit, which discharges paper with the print face of a recording medium down, enables the print result of N pages to be sorted in the page order.

The face-up paper discharge unit, which discharges paper with the print face of a recording medium up, places the print result of N pages in the reverse order to the page order.

The sorter paper discharge unit, which has, for example, P paper discharge ports, enables the host computer to specify paper discharge ports for printing. Thus, M copies of an N-page print can also be printed.

The sorter paper discharge unit also enables printing with face-down paper discharge. In this case, the first page is discharged to the first to Mth paper discharge ports one sheet to each port, next the second page is discharged to the first to Mth paper discharge ports one sheet to each port, . . . last the Nth page is discharged to the first to Mth paper discharge ports one sheet to each port, whereby M copies of the N-page print sorted in the page order can be provided. This will be discussed specifically as follows:

FIG. 2 shows an example of a sorter paper discharge unit, which will be hereinafter abbreviated as the sorter. Information sent from a host 1 is processed by a controller 7 and is printed on paper 13 by an engine 11, and the paper is sent to a fixing roller 20. The paper 13 passing through the fixing roller 20 is diverted by a face up/down switch 34 to a face-up tray 31 if face-up print is executed or to the sorter 30 if face-down print is executed.

For face-down print, the sorter 30 can be used in various manners; here, the operation of the sorter 30 when the number of copies is specified will be discussed. For example, to make five copies of a print consisting of N pages, the paper of the first copy of the first page of the N-page print is discharged to a bin 32a, the paper of the second copy of the first page of the N-page print is discharged by a switch 33b to a bin 32b, . . . , and the paper of the fifth copy is discharged by a switch 33e to a bin 32e. Next, the paper of the first copy of the second page of the N-page print is discharged to the bin 32a, the paper of the second copy of the second page of the N-page print is discharged by the switch 33b to the bin 32b, . . . , and the paper of the fifth copy is discharged by the switch 33e to the bin 32e. When the steps are repeated until the fifth copy is printed, all print is complete. Thus, five copies of the N-page print are made on the bins 32a–32e.

On the other hand, to print one copy of an N-page print in a face-up paper discharge mode using a sorter paper discharge unit, an N-page print sorted in the reverse order to the page order is made because paper is discharged with the print faces of recording media up as described above. Thus, the operator must resort the print result in the page order after print.

Also, the sorter paper discharge unit is expensive and large and occupies a large installation area.

Further, when the sorter paper discharge unit has P paper discharge ports, if P<M, print needs to be executed separately integer [(M+P−1)/P] times, and takes time. This means that although the 6-stage sorter is shown in the example in FIG. 2, the host 13 must send print information to the printer repeatedly [(M+6−1)/6] times if the number of copies M becomes seven or more.

Printers having no sorter paper discharge unit for the reasons as described above are also known. In this case, to attempt to print M copies of an N-page print, normally a host computer transmits print information to a printer in the order of M copies of the first page, M copies of the second page, . . . , M copies of the Nth page, and the printer prints M copies of the first page, M copies of the second page, . . . , M copies of the Nth page in order.

In this case, however, the operator must resort the print media of M copies each consisting of N pages taken out from the paper discharge ports so that the first to Nth pages sorted make up one copy for convenience of distribution of the copies.

This problem becomes furthermore serious when M copies of a print made up of a group consisting of Na, Nb, Nc, . . . , Nx pages (Na, Nb, Nc, . . . , Nx are integers of 1 or more independently of each other) are made. That is, to make M copies of a print made up of (Na+Nb+Nc+ . . . +Nx) pages, one copy consisting of 1, 2, . . . , Na, one copy consisting of 1, 2, . . . , Nb, one copy consisting of 1, 2, . . . , Nx must be taken out from M copies of the first page, M copies of the second page, . . . , M copies of the Nath page, M copies of the first page, M copies of the second page, . . . , M copies of the Nbth page, . . . , M copies of the first page, M copies of the second page, . . . , M copies of the Nxth page printed in order for finally providing M copies of one distribution unit (Na+Nb+Nc+ . . . +Nx).

Then, to eliminate the complicated procedure, a method is proposed wherein output of repeating printing of print matter of pages 1–N M times or output of repeating printing of print matter of (Na+Nb+Nc+ . . . +Nx) pages consecutively M times is performed from a host computer to a printer.

However, this method involves a problem that it takes much time as compared with the method using the sorter paper discharge unit.

This problem also means that to print more than one copy of a print made up of more than one page, any other operation cannot be executed over a long time in the host computer which does not accept another command until the printing is complete.

If the host computer is provided with a print information spool function, print information is sent by background processing until the printing of more than one copy is complete, thus the printing speed of the printer lowers and the operation of the host computer also slows down because of the background print processing.

Further, even if the method is used, the problem that in the face-up print mode, the resultant print pages must be resorted in the order of the first page to the Nth page still remains unsolved.

SUMMARY OF THE INVENTION

It is therefore an object of the invention to provide an image information print system and an image information print method which enable print specifications to be changed even after print information is transmitted to a printer and eliminate the need for transmitting all print information when the print specifications are changed. It is another object of the invention to provide an image information print system and an image information print method which can provide a desired number of copies of a desired print in a desired page order in the minimum time with the minimum labor without using a sorter paper discharge unit.

To the ends, according to a first form of the invention, there is provided an image information print system comprising means for receiving data containing print information input from a host computer, job language interpretation means for interpreting the data, format conversion means for converting a format of the print information to prepare intermediate print information, means for storing the data and the intermediate print information, print management means for issuing a print execution instruction based on print specifications of print information contained in the data according to interpretation of the job language interpretation means, and print execution means for converting the intermediate print information into bit image data and executing print based on the instruction of the print management means.

In a second form of the invention, in the image information print system in the first form, the storage means consists of a RAM and auxiliary storage means, and the image information print system further includes storage management means for determining which of the RAM and the auxiliary storage means the data and intermediate print information are to be stored in.

In a third form of the invention, the image information print system in the first or second form further includes capacity limit recognition means, while data containing print information is being received at the reception means, if intermediate print information prepared from the print information and stored in the storage means exceeds a predetermined capacity, the capacity limit recognition means sets the intermediate print information stored before the intermediate print information exceeds the predetermined capacity as a cluster of intermediate print information and informs the print management means of the fact.

In a fourth form of the invention, in the image information print system in any of the first to third forms, the predetermined capacity of the capacity limit recognition means is a storage capacity limit of the storage means.

In a fifth form of the invention, in the image information print system in any of the first to fourth forms, the job language interpretation means detects a first start job command and a last end job command from among the data and recognizes print information sandwiched between the start and end job commands as a cluster of print information.

In a sixth form of the invention, in the image information print system in any of the first to fifth forms, the print specifications comprise at least one selected out of a group consisting of confidential print, reverse-order print, test print, multiple-copy print, and command wait print.

In a seventh form of the invention, in the image information print system in the sixth form, a desired print form can be specified for stored intermediate print information from the host computer if the print specifications indicate command wait print.

In an eighth form of the invention, the image information print system in the sixth form further includes input means through which desired print specifications can be specified for stored intermediate print information if the print specifications indicate command wait print.

In a ninth form of the invention, the image information print system in any of the first to eighth forms further includes paper discharge face specification means for specifying face-down or face-up paper discharge, wherein the print management means determines a conversion processing procedure of the intermediate print information stored in the storage means into bit image data so that a print provided as a result of printing is sorted in a desired page order in response to paper discharge face information provided by the paper discharge face specification means.

In a tenth form of the invention, the image information print system in any of the first to eighth forms further includes paper discharge face specification means for specifying face-down or face-up paper discharge, wherein the print management means detects information indicating face-down or face-up paper discharge provided by the paper discharge face specification means before reception of print information from the host computer and if conversion processing of intermediate print information into bit image data may be performed in a print information reception order in response to the paper discharge face information, converts the intermediate print information into bit image data in desired units without waiting for a cluster of intermediate print information to be stored in the storage means, or if the intermediate print information is converted into bit image data in an order reverse to the print information reception order, waits for a cluster of intermediate print information to be stored in the storage means before starting conversion of intermediate print information into bit image data.

According to an eleventh form of the invention, there is provided an image information print method comprising the steps of receiving data containing print information input from a host computer, interpreting the data, converting a format of the print information to prepare intermediate print information, storing the intermediate print information in storage means, issuing a print execution instruction based on print specifications interpreted, and converting the intermediate print information into bit image data and executing print based on the issued instruction.

According to the invention, various print specifications can be easily selected and print can be executed in various forms without the need for operation from the host computer.

For example, even to execute copy print of more than one copy of more than one page, the host needs to send print information to the printer only once, so that the communication time with the host can be shortened, resulting in shortening of the host release time, enabling the operator to start another job earlier than was previously possible. Since the print information reception time from the host can be omitted, the image information print system can print in a short time for making multiple copies.

Print information sent from the print driver of the host is received at the printer and is converted into intermediate print information, which then is stored. When a cluster of the intermediate print information is stored, the intermediate print information corresponding to the first or last page is expanded into a bit image in response to the face-down or face-up paper discharge mode, whereby a print is always provided in the correct page order.

DETAILED DESCRIPTION OF THE PREFERRED EMBODIMENTS

Figure 1:
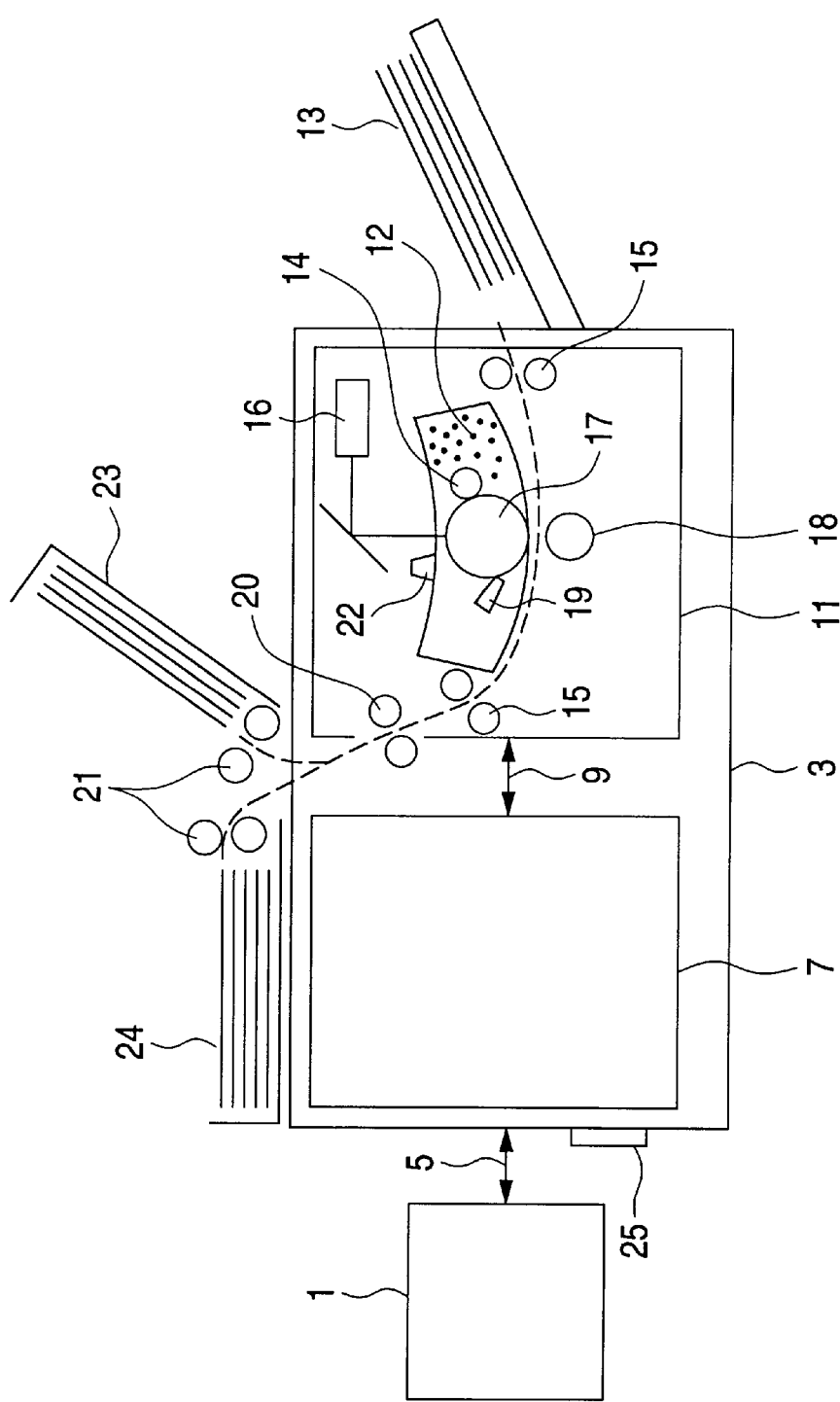
FIG. 1 shows an image information print system applied to the invention.
Figure 2:
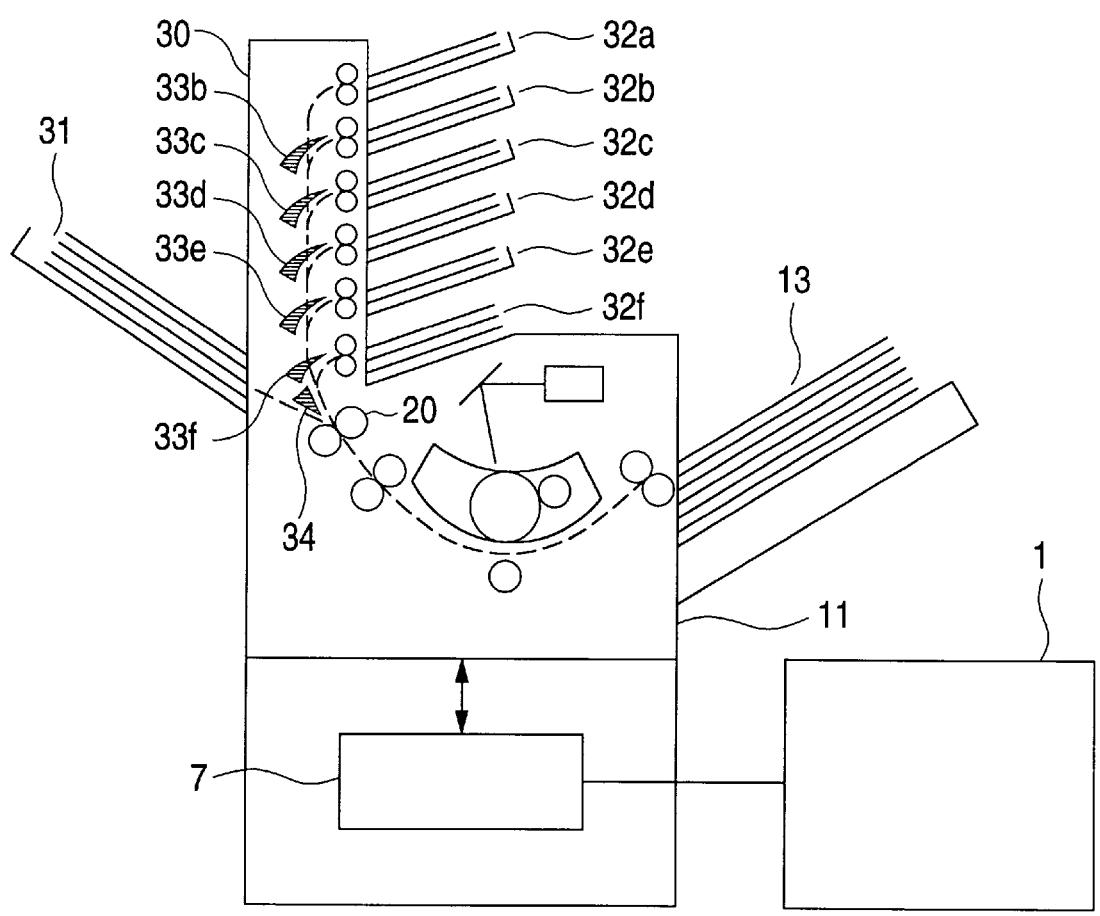
FIG. 2 shows a conventional image information print system having a sorter.

FIG. 1 shows a schematic configuration of a printer of one embodiment of an image information print system of the invention.

Figures 6, 7:
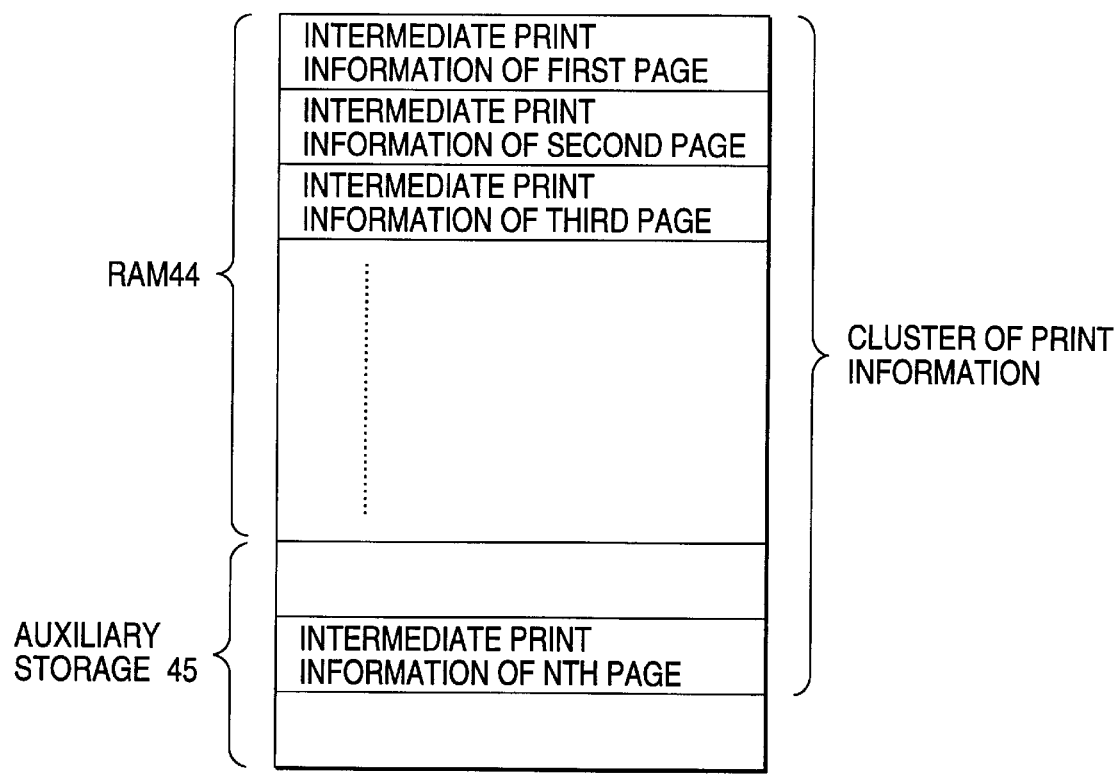
FIG. 6 is an illustration to show data format examples of print information of the invention.
FIG. 7 is an illustration to show intermediate print information saved in storage means in the inveniton.

In the figure, a printer 3 is connected to a host computer (host) 1 via an interface 5 and receives description data of images to be printed and various control commands, which will be hereinafter referred to as print information, from the host 1. However, they also contain declaration commands of the start and end of a print job as shown in FIG. 6. The interface 5 of the printer 3 to the host 1 generally is called a host interface.

The internal configuration of the printer 3 can be roughly divided into a controller 7 and an engine 11. An interface between the controller 7 and the engine 11 generally is called a video interface. The controller 7, which operates under a programmed microcomputer, has the main functions of interpreting reception data from the host 1, preparing intermediate print information of an image to be printed, and sending the intermediate print information to the video interface 9 as bit map data at the same time as print starts, and controlling the timing of the print operation performed by the engine 11.

The engine 11 comprises a mechanism 15 for transporting paper 13, a charger 22, a laser exposure device 16, a photosensitive drum 17, toner 12, a developing unit 14, a transfer roller 18, a cleaner 19, a fixing roller 20, and an offset paper discharge unit 21. It performs a sequence of print processing of timing control of the controller 7, bit map data preparation of images, engine control, etc.

When printing is started, the photosensitive drum 17 is charged at a negative potential by the charger 22 and an electrostatic latent image is formed on the photosensitive drum 17 by vertical scanning of the photosensitive drum 17 and by horizontal scanning of a laser beam scanned crossing the rotation direction of the photosensitive drum 17 by the laser exposure device 16, whereby charges disappear on the surface of the photosensitive drum 17 to which the laser beam is emitted and the charge potential is held in portions to which the laser beam is not emitted. Thus, toner of the developing unit 14 having negative charges is attracted only to the portions on the photosensitive drum 17 exposed to the laser beam and the electrostatic latent image is visualized by the developing unit 14.

Next, the toner on the photosensitive drum 17 is transferred to paper by the transfer roller 18. The untransferred toner remaining on the photosensitive drum 17 is cleaned by the cleaner 19 after the termination of the transfer, and the photosensitive drum 17 prepares for the next charge process. Upon completion of the transfer step, the fixing roller 20 fixes the toner on the paper thereon by pressure and heat. Print of one page is now complete.

Figure 5:
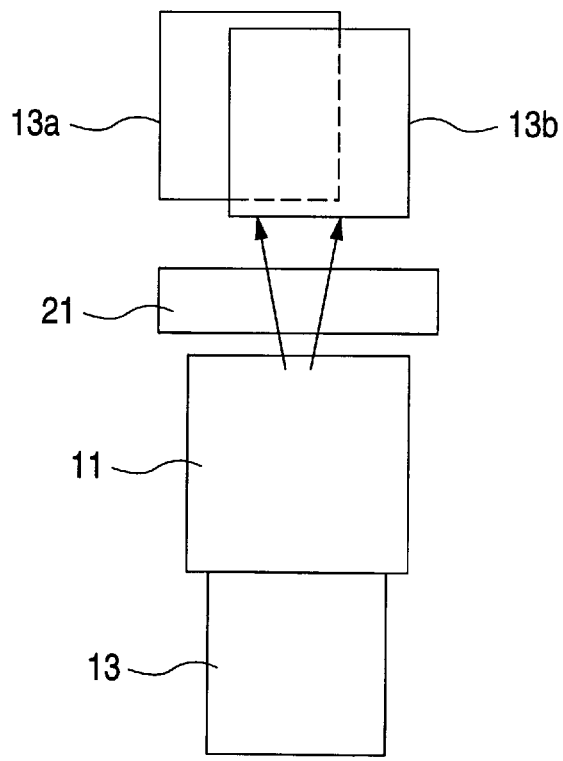
FIG. 5 is an illustration to show an offset paper discharge unit of the invention.

Here, the offset paper discharge unit 21 can discharge paper to positions 13a and 13b as desired according to specification as shown in FIG. 5.

The printer 3 has connection means 25 for mounting an auxiliary storage, whereby more print information can be stored in the printer and even a print consisting of a larger number of pages can be provided easily in any desired page order.

In the embodiment, a virtual storage system may be used to save intermediate print information in an external auxiliary storage 45 simply if the available memory capacity of a RAM 44 becomes small, as shown in FIG. 7, which shows that the RAM 44 and the auxiliary storage 45 are virtually one body when viewed from the controller 47 and intermediate print information is written into the virtual memory (storage) in sequence. Which of the RAM 44 and the auxiliary storage 45 the intermediate print information is to be saved in may be determined so that the data can be saved and consumed efficiently by considering the difference between the read time and the write time caused by the difference between the RAM 44 and the auxiliary storage 45, the print information transfer rate from the host, the print information processing (print information analysis to print execution) speed at the printer, and any other factors. This topic will be discussed later.

Figure 3:
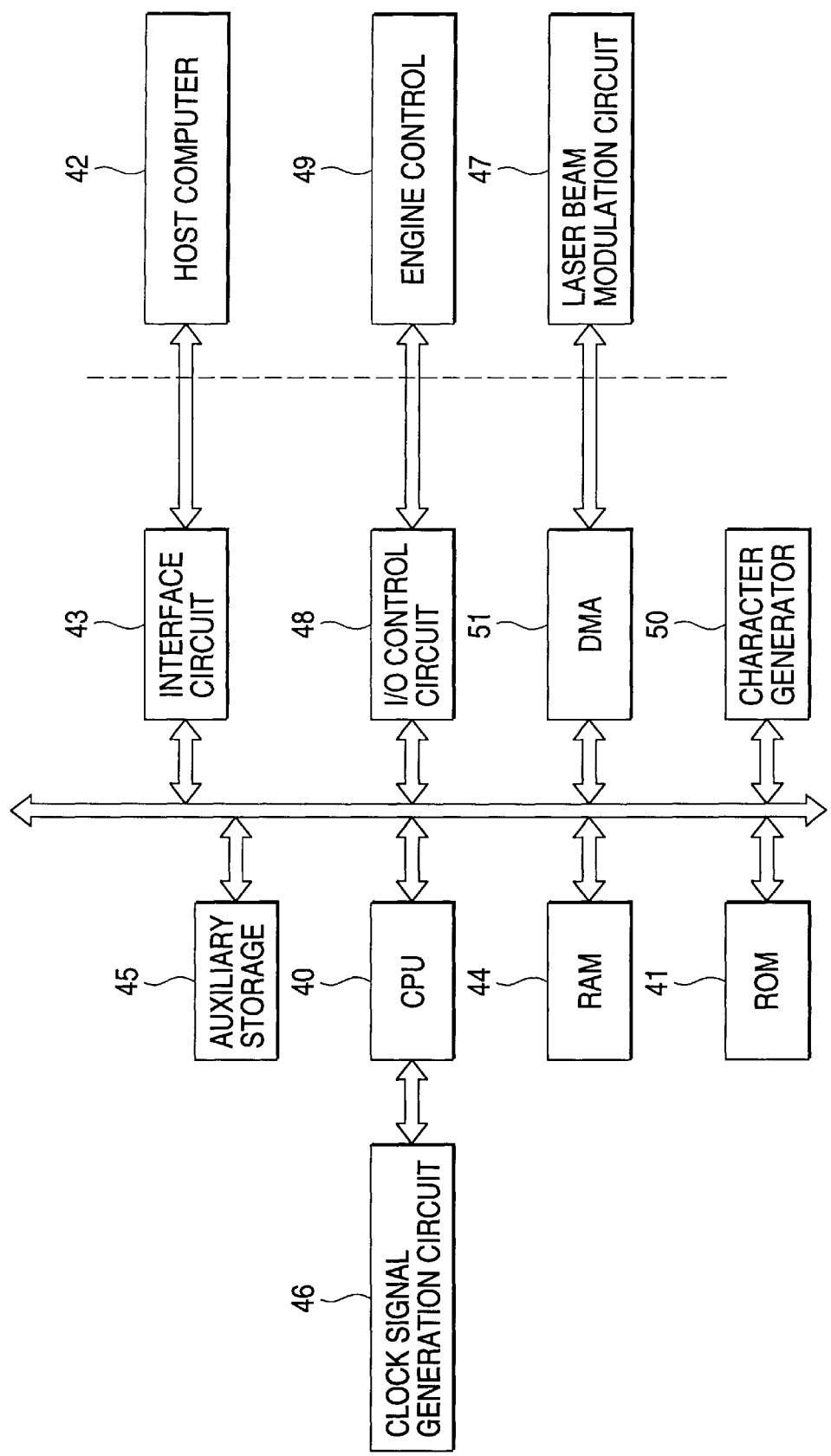
FIG. 3 is a block diagram of a controller of the image information print system applied to the invention.

FIG. 3 is a block diagram of the controller 7. The operation will be discussed with reference to FIGS. 1 and 3.

In synchronization with a clock signal generation circuit 46, a CPU 40 executes an instruction read from a ROM 41 and controls the entire controller. When an emergency process (not shown) such as an interrupt is requested, the interrupt service is executed with the current state held and upon completion of the interrupt service, the interrupted operation is resumed. The ROM 41 stores tables, initialization data, fonts, etc., in addition to the instructions.

Figure 4:
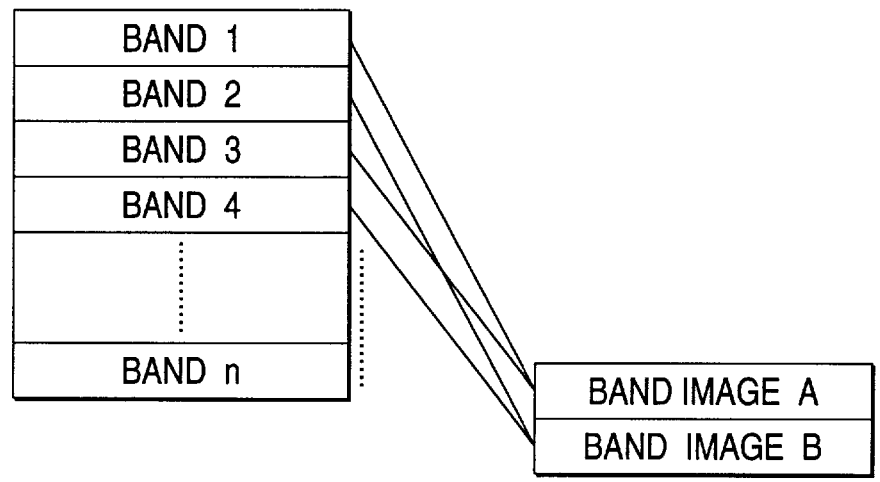
FIG. 4 is an illustration to explain block processing of one page.

Print information sent from a host computer 42 is stored through an interface circuit 43 in a reception buffer existing in the RAM 44. The CPU 40 interprets the reception buffer contents and converts the contents into intermediate print information fitted for print of the engine 11. For the intermediate print information, a printed image is divided into bands as shown in FIG. 4 and stored in the RAM 44 of storage means in band units.

Upon completion of preparation of at least one page of the intermediate print information, the controller 7 can send a print start instruction via an I/O control circuit 48 to an engine controller 49 for the engine 11. In this case, first the intermediate print information of bands 1 and 2 is converted on band images A and B and the conversion result is temporarily saved in an image buffer existing in the RAM 44, then a wait is made for a DMA 51 to start. When the I/O control circuit 48 senses that paper has come to a predetermined position, the DMA 51 starts the operation and sends the bit image on the band image A via the video interface of the engine to a laser beam modulation circuit 47 for forming an electrostatic latent image on the photosensitive drum 17.

Upon completion of sending the bit image on the band image A, the intermediate print information of band 3 is converted on the band image A. Next, upon completion of sending the bit image on the band image B, the intermediate print information of band 4 is converted on the band image B. This process is continued until completion of one page, and print of one page is complete. At this time, text information is copied to the band image A or B by a character generator 50 as required.

The image information print system stores the intermediate print information in a compression format to increase the storage efficiency of the RAM 44 and the auxiliary storage 45. In this case, a program required for data compression and a program required for decompressing the compressed data are both stored in the ROM 41. Several compression formats are possible, but the compression format does not characterize the invention and therefore will not be discussed here.

In the first embodiment of the invention, print information sent from a printer driver of the host is received at the printer and is converted into intermediate print information, which then is stored. When a cluster of the intermediate print information is stored, a print can always be provided in the correct page order by expanding the intermediate print information corresponding to the first or last page in response to the face-down or face-up paper discharge mode into bit images.

In the invention, the print information sent from the printer driver of the host may be sent to the printer in the data format as shown in FIG. 6. Here, the print is made up of N pages (also containing Nx), Js and Je are a start declaration and an end declaration of a print job, M is the number of copies, and { } indicates the effective range of M, Js and Je.

Example 1 provides the most primitive data format in which a code indicating the data end, such as FF code, is entered at the end of print information consisting of description data of images to be printed and various control commands. Example 2 and the later are effective when more advanced control can be performed between the host and the printer. Example 2 is a data format containing a command declaring the start of a print job (start job Js), a command declaring the end of the print job (end job Je), and a numeric value M indicating an argument specifying the number of print copies in addition to print information consisting of description data of images to be printed and various control commands. Example 3 is a nested structure of the data format in Example 2; one job is made up of a plurality of print information groups (for example, Na is header paper, Nb is an envelope, Nc is letter A, . . . ) and M copies of them are specified. In Example 4, which is similar to Example 3, one job is formed by collecting a plurality of small jobs each with specification of M copies. In Example 5, M indicating the number of copies is also used as Js and Je indicating start and end declarations of a print job instead of them, whereby a cluster of jobs and the number of copies can be seen at a time. In Example 6, M is used to represent the same data format as in Example 3.

In the data formats as in Examples 5 and 6, the commands declaring the start and end of a print job and a numeric value specifying the number of copies are all Ms. In Examples 1–6, specification of the number of copies is taken as an example; for example, a confidential print command, a command wait print command, a reverse order print command, a test print command, etc., can be contained in job commands.

A method of providing M copies of a print consisting of N pages in Example 2 will be discussed.

When print information is sent from the host 1 in the order of Js{M{1,2,3,4, . . . ,N}}Je, the controller 7 stores the print information in the RAM 44 or the auxiliary storage 45 as intermediate print information. When the end job comes, the controller 7 starts a conversion process into a bit image. At this time, the process start order is switched depending on the face-down or face-up paper discharge mode. This means that conversion of the print information corresponding to the first page is started in the face-down mode or conversion of the print information corresponding to the last page is started in the face-up mode.

The user may be able to select the face-down or face-up paper discharge mode through a user interface of the printer driver, a control panel of the printer etc.,; alternatively, if a tray specified by a sensor, etc., can recognize the face-down or face-up paper discharge mode, control can also be performed so as to automatically specify whether conversion into a bit image is performed in the print information sending order or its reverse order. To set the paper discharge mode through the user interface of the printer driver, the mode may be recognized from the face-down or face-up paper discharge mode specification information contained in print information. To set the paper discharge mode through the control panel of the printer, etc., setting of the mode may be stored for the controller to reference the stored information as required. For the system to automatically determine the paper discharge mode, the currently available tray may check whether the paper discharge mode is face-down or face-up by a mechanical sensor, eta. In any way, such discharge paper face specification or recognition means is provided, whereby bit image conversion order control and print output order control can be performed accordingly.

When a block of 1, 2, 3, 4, . . . , N is prepared, the controller 7 switches the offset paper discharge 21 to the opposite position, thereby giving an offset. If M is two or more and more than one copy needs to be printed, the operation of again expanding the intermediate print information stored in the storage means into a bit image is repeated M times, thereby eliminating the need for repeating M times an instruction for outputting a print consisting of pages 1–N from the host to the printer as with the conventional printer driver. The host needs only to once transmit the print information for outputting the N-page print and a numeric value indicating the number of repetitions, so that the time to releasing the host can be shortened.

If the resultant prints are taken out in the offset units, M copies of the N-page print printed in the order of 1, 2, 3, 4, . . . , N can be provided. Since a large value can be taken as the number of copies M because there is no restriction on the sorter from the number of trays, an economical sorter can be provided.

Figure 8:
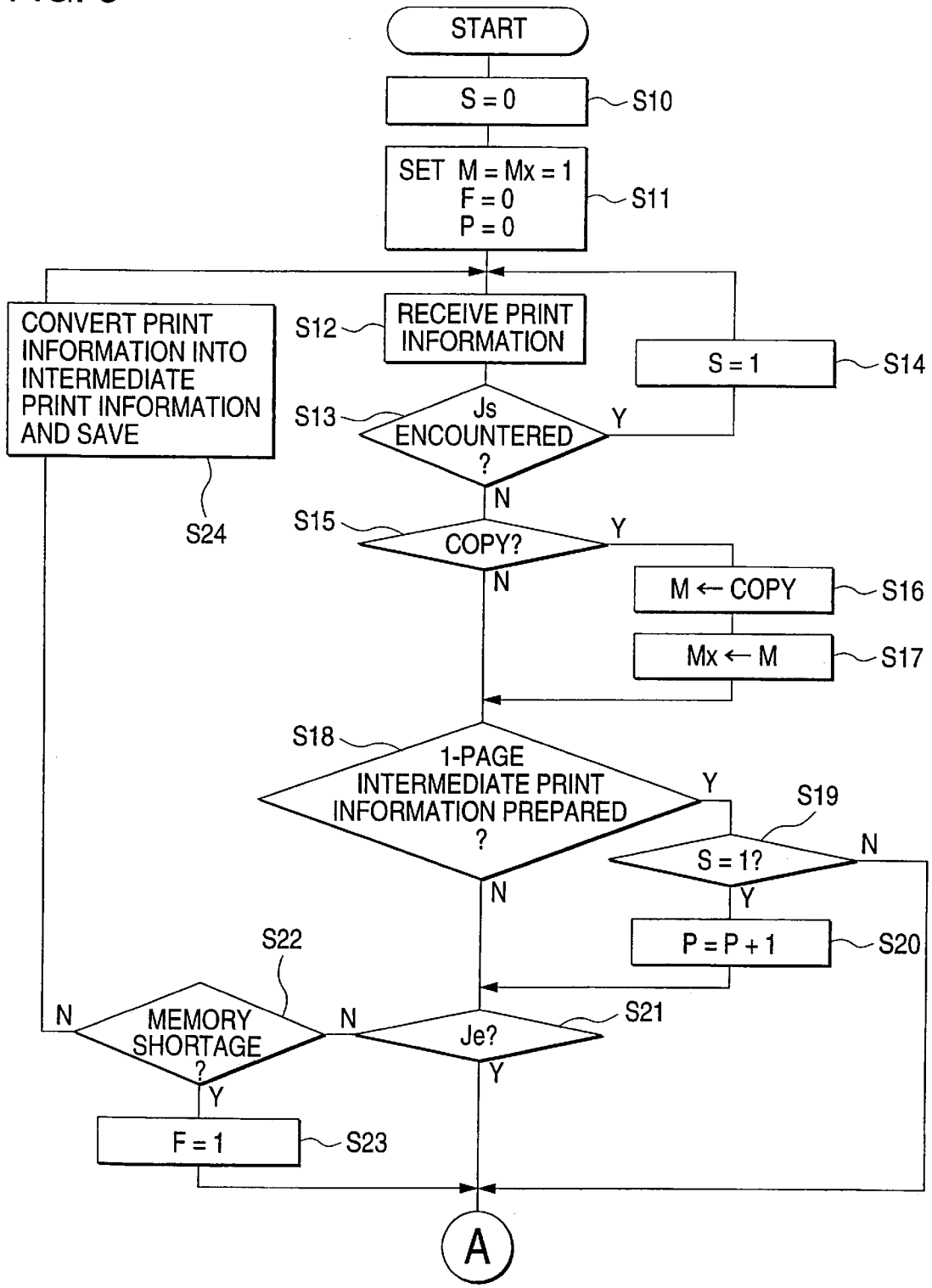
FIG. 8 is a flowchart to show a process flow (upstream) of the controller of the invention.
Figure 9:
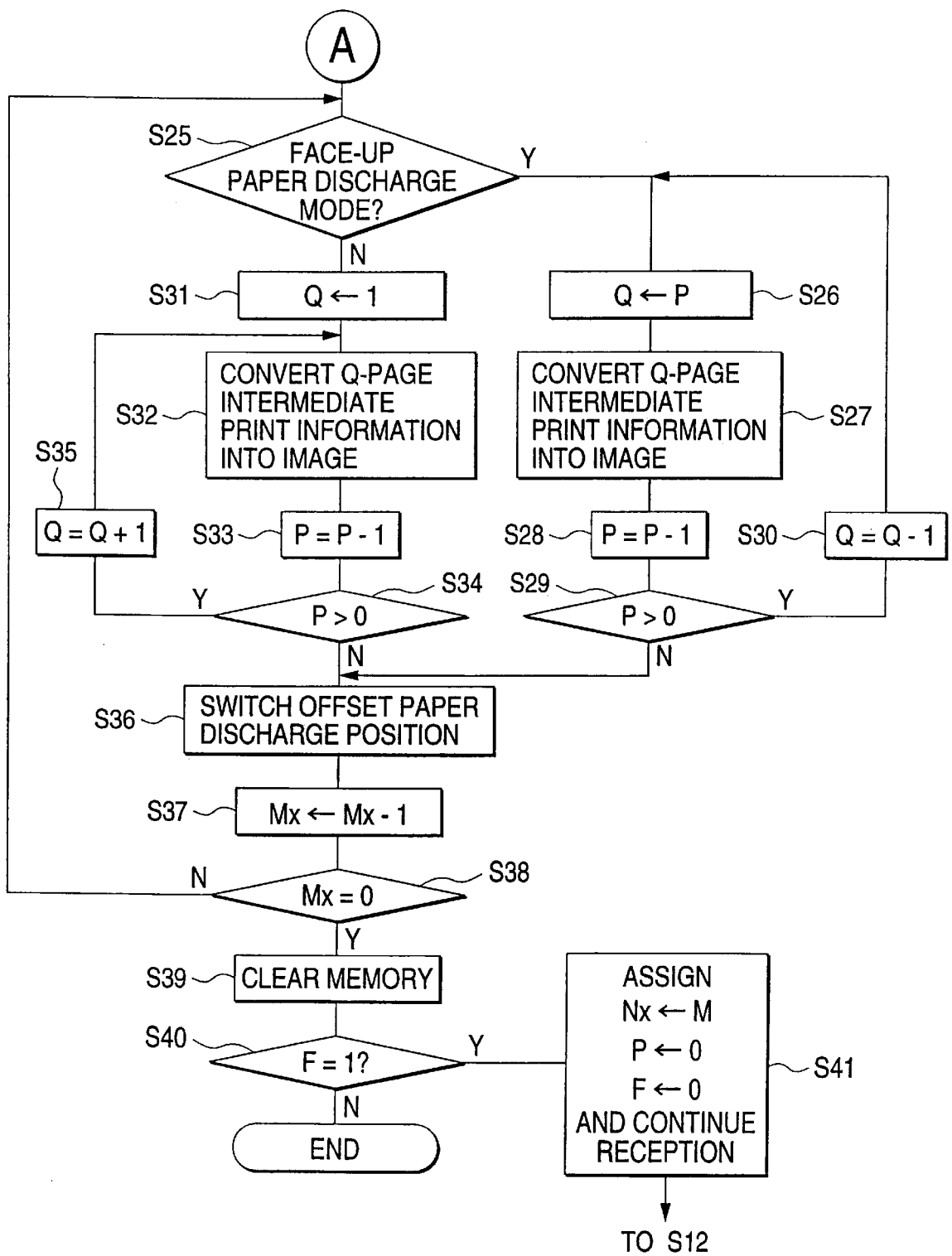
FIG. 9 is a flowchart to show a process flow (downstream) of the controller of the invention.

FIGS. 8 and 9 show process flows of the controller 7 when the data format in Example 2 is applied.

A flag S indicating the presence or absence of the specification of the number of copies is set to 0 (no specification) at step S10 in FIG. 8. Initialization is executed at step S11, wherein M is a number-of-copies register, Mx is a number-of-copies counter, P is the number of pages of intermediate print information stored in the storage means and prepared, and F is a flag set to 1 when a memory overflow occurs. Print information containing a job is received at step S12. If Js (print job start) is encountered at step S13, S=1 is set at step S14 and receiving the print information is continued. On the other hand, if Js is not encountered at step S13, an attempt is made to detect the number of copies at step S15. If the number of copies is detected, it is saved in M at step S16 and the count is also saved in Mx at step S17. A check is made to see if 1-page intermediate print information has been prepared at step S18. If YES is returned, whether or not print job start command Js is found is checked at step S19. If Js is found, no print is executed and control goes to step S20 at which the counter P is incremented by one and preparing of intermediate print information of the next page is continued. On the other hand, if Js is not found at step S19, control goes to step S25 (FIG. 9) to start print. At step S21, whether or not Je (print job end) is encountered is checked. If Je is encountered, control goes to step S25 (FIG. 9) to start print. On the other hand, if Je is not encountered at step S21, whether or not the remaining available capacity of the storage means is less than a predetermined value is checked at step S22. If the remaining available capacity is less than the predetermined value, the storage means is assumed to be short of available memory capacity and the flag F is set to 1 at step S23. Then, control goes to step S25 (FIG. 9) to start print. If the storage means is not short of available memory capacity, the print information is converted into the intermediate print information format at step S24 and reception is continued.

At step S25 in FIG. 9, whether or not the paper discharge mode is face-up is checked at step S25. If the paper discharge mode is face-up, P is assigned to a print order specification page counter Q at step S25. Print is started at the last page and is continued until Q becomes 0 at steps S26 to S30. On the other hand, steps S31 to S35 are a process flow in the face-down paper discharge mode, which will not be discussed.

When P becomes equal to or less than 0 at step S34, the offset paper discharge unit is switched to the different position for the next partial print at step S36. The number-of-copies counter Mx is decremented by one and the result is assigned as new Mx at step S37. Whether or not the number-of-copies counter Mx is 0, namely, as many copies as the number of copies have been printed is checked at step S38. If the number of copies is not reached, control returns to step S25 and print is repeated. If the number of copies is reached, all information read from the storage means and printed is deleted from the storage means at step S39. A check is made to see if print is executed because of memory shortage at step S40. If YES is returned, the number-of-copies counter Mx is again set and P and F are initialized to receive the remaining information at step S41, then control returns to step S12 to continue receiving information. If memory shortage does not occur at step S40, all print processing is complete.

Next, Example 3 in FIG. 6 will be discussed. M copies of a print made up of a group consisting of Na, Nb, Nc, . . . , Nx pages (Na, Nb, Nc, . . . , Nx are integers of 1 or more independently of each other) described in the conventional example can also be made according to the invention.

This case is on the precondition that information of the number of copies is also sent from the host, and the printer needs also to recognize the information of the number of copies. When print information is sent from the host 1 in the order of Js{M{1,2,3,4, . . . ,Na}, {1,2,3,4, . . . ,Nb}, . . . , {1,2,3,4, . . . ,Nx}}Je, it is stored in the RAM 44 or the auxiliary storage 45 as intermediate print information. If the face-down paper discharge mode is specified, when print is executed in the order of 1, 2, 3, 4, . . . , Na, 1, 2, 3, 4, . . . , Nb, . . . , 1, 2, 3, 4, . . . , Nx, the offset paper discharge unit 21 is switched to the opposite position and the process is repeated M times; if the face-up paper discharge mode is specified, while the offset paper discharge unit 21 is switched in the reverse order, the process is repeated M times, whereby M copies of the print sorted in the order of 1, 2, 3, 4, Na, 1, 2, 3, 4, . . . , Nb, . . . , 1, 2, 3, 4, . . . , Nx can be provided, and moreover each copy of the print is sorted in the group order and thus can be taken out easily.

By the way, if the controller 7 can recognize user setting before receiving print information, the necessity for waiting for conversion processing into a bit image until a cluster of intermediate print information is all stored may be able to be eliminated. That is, if user setting of face-down paper discharge mode specification is previously recognized, print information can be converted into bit images in the reception data order without waiting for conversion processing into a bit image until the print job end is recognized; if user setting of face-up paper discharge mode specification is previously recognized, starting of conversion into a bit image is suppressed until the print job end is recognized. This will be discussed with the system in FIG. 1. To discharge paper to the face-down tray 23, processing as conventional is performed and the print result in the page order can be produced without losing the time taken for providing the print. On the other hand, to discharge paper to the face-up tray 24, when print information is sent from the host 1 in the order of Js{1,2,3,4, . . . ,N}Je, it is stored in the RAM 44 as intermediate print information and when the print job end comes, the intermediate print information corresponding to the last page is read from the RAM 44 and is expanded into a bit image, which then is sent to the engine 11, whereby print is executed in the order of N, . . . , 4, 3, 2, 1, whereby the print result in the page order can be produced more rapidly in response to the setting.

Although we have discussed six examples in FIG. 6, the embodiment of the invention can also be applied to other examples; if at least a cluster of print information can be recognized or prepared as a result, it is sufficient.

For example, intermediate print information is stored in the storage means and the available storage limit in which information cannot be stored any more is reached. The information stored to the limit can also be assumed to be a cluster of intermediate print information. In this case, (1) a case where no job cluster as listed in FIG. 6 can be prepared or (2) a case where one or more job clusters can be prepared can occur until the available storage limit is reached.

The case in (1) is, in other words, a case where the storage means containing the auxiliary storage 45 becomes full before all print information is stored as a cluster of intermediate print information, for example, the storage means becomes full before the print job end following the last Nth-page print information is recognized. In this case, a trigger defined by the available memory capacity of the storage means is set, the intermediate print information already stored in the storage means is used to perform print processing in any desired page order according to the trigger, and at the termination of the processing, the remainder received during the processing, converted into intermediate print information, and stored in the storage means is processed, whereby although copies of a print sorted in the desired page order to the last Nth page cannot be provided, a print can be provided in the correct page order for each predetermined unit determined from the available storage capacity of the storage means. Thus, the last resorting labor required for the operator can be lessened.

On the other hand, the case in (2) is, in other words, a case where if one or more clusters of intermediate print information separated by an end code or a job as shown in FIG. 6 are stored in the storage means, conversion of the intermediate print information into a bit image is not started until the capacity of the storage means reaches a predetermined value. This predetermined capacity of the storage means is assumed to be 50%, 80%, etc., of the storage limit capacity of the storage means, for example. In this case, a trigger defined by the predetermined capacity of the storage means is set and one or more clusters of the intermediate print information already stored in the storage means is used to perform print processing in any desired page order according to the trigger.

When conversion of the intermediate print information into a bit image is started, reception means need not stop receiving print information from the host, because conversion of the intermediate print information into a bit image is executed independently of reception of print information by the reception means. This is also applied when the trigger for conversion of the intermediate print information into a bit image is set as the storage capacity limit of the storage means. That is, if the intermediate print information is converted into a bit image and the bit image is sent to the engine, an empty area of the storage means occurs, thus it is not necessary to stop receiving information from the host.

The printer driver that can be used with the image information print system of the invention may have at least a function of sending description data of the image to be printed and control commands representing it. If it also has a function of separating print information in the format easily identifying one cluster of print information and representing it, it is more convenient when viewed from the image information print system. For example, the format is any of the data formats as in Examples 2–6 in FIG. 6. However, the function itself of the printer driver can be provided in any way and the image information print system of the invention is not restricted by the embodiment.

Another embodiment of the invention will be discussed. In the embodiment, a specific configuration example of the controller 7 for totally controlling data reception containing print information to print execution as described above is given and different print specification processing will be described. However, this does not mean that the first embodiment discussed above is not in such a configuration; processing as described above can be performed in a similar configuration.

In the embodiment, processing is performed by executing the following tasks alternately: A reception task for receiving data from a host 1 at a reception buffer, a job language interpretation task for reading the data stored in the reception buffer and interpreting the data, a print data analysis task for converting print information data into intermediate print information and storing the intermediate print information in an intermediate print information buffer, an image preparation task for preparing a bit image from the intermediate print information stored in the intermediate print information buffer and storing the bit image in a print queue, a task for monitoring a control panel 62 and accepting reset input, a task for feeding or discharging paper, a task for making a print request, etc., (which will be discussed in detail later). These tasks are assigned priorities and generally are executed alternately in several-msec-order time units based on the priorities. Also available are a standby mode transition task for causing a print mechanism 25 to make the transition from an operation mode to a standby mode and a standby mode release task for releasing the standby mode and making the transition to the operation mode. For example, if a real-time monitor detects no data input for print operation for a given time (for example, five minutes) or more or no user operation of a keyboard 15 for a given time or more, the standby mode transition task is executed for making the transition from the operation mode to the standby mode. When an analysis section 51 executes the various tasks, for example, the real-time monitor of an aggregate of programs executed on the order of 1 msec or less references the priorities of the tasks, etc., for determining which task the CPU use right is to be passed to. The tasks discussed later are given for example and the types, etc., are not limited to them. For example, management execution of print specifications and conversion of intermediate print information into a bit image are assigned to a single task, but may be assigned to separate tasks, needless to say.

Figure 10:
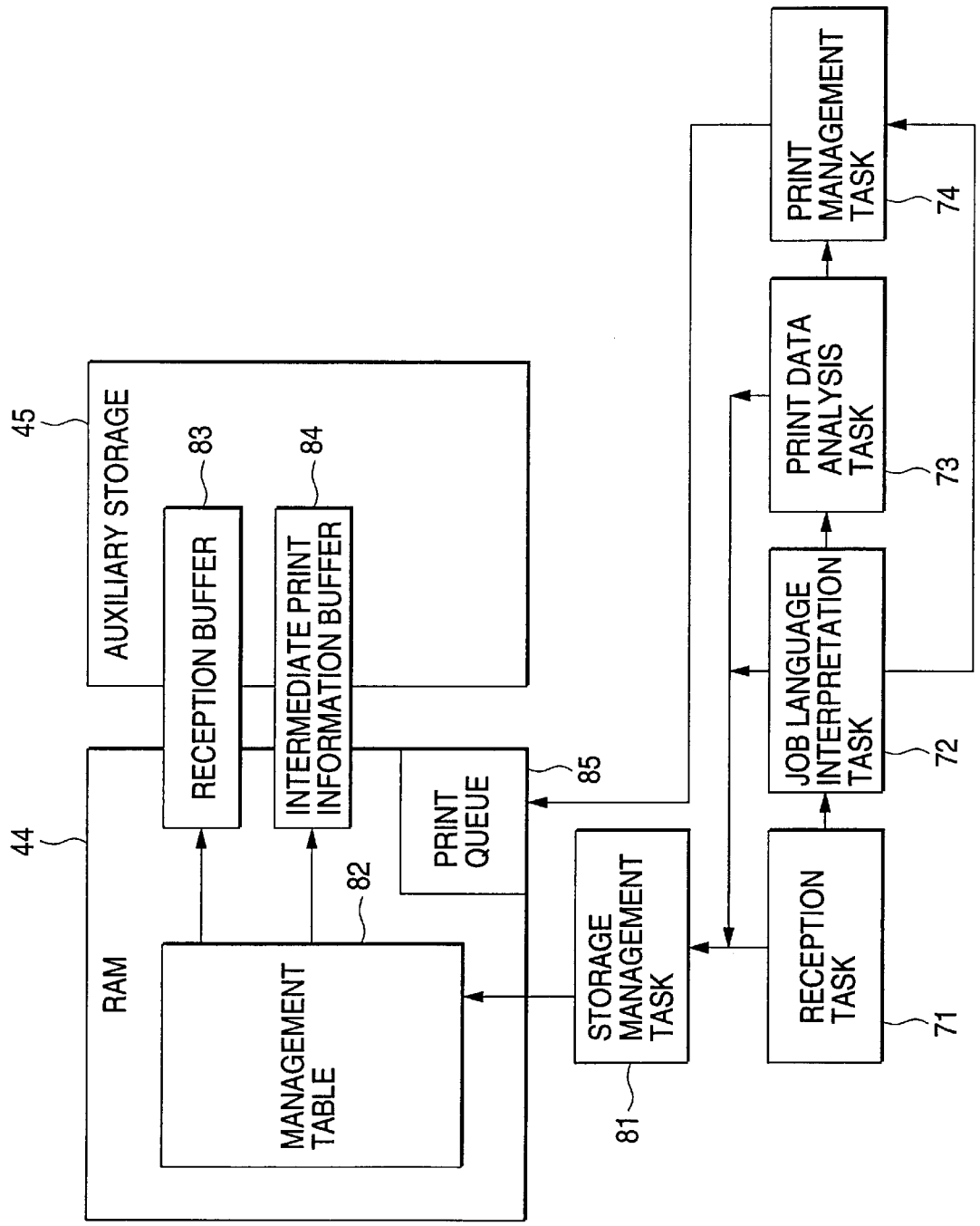
FIG. 10 is a diagram to show functional blocks of a controller of the invention.
Figure 11:
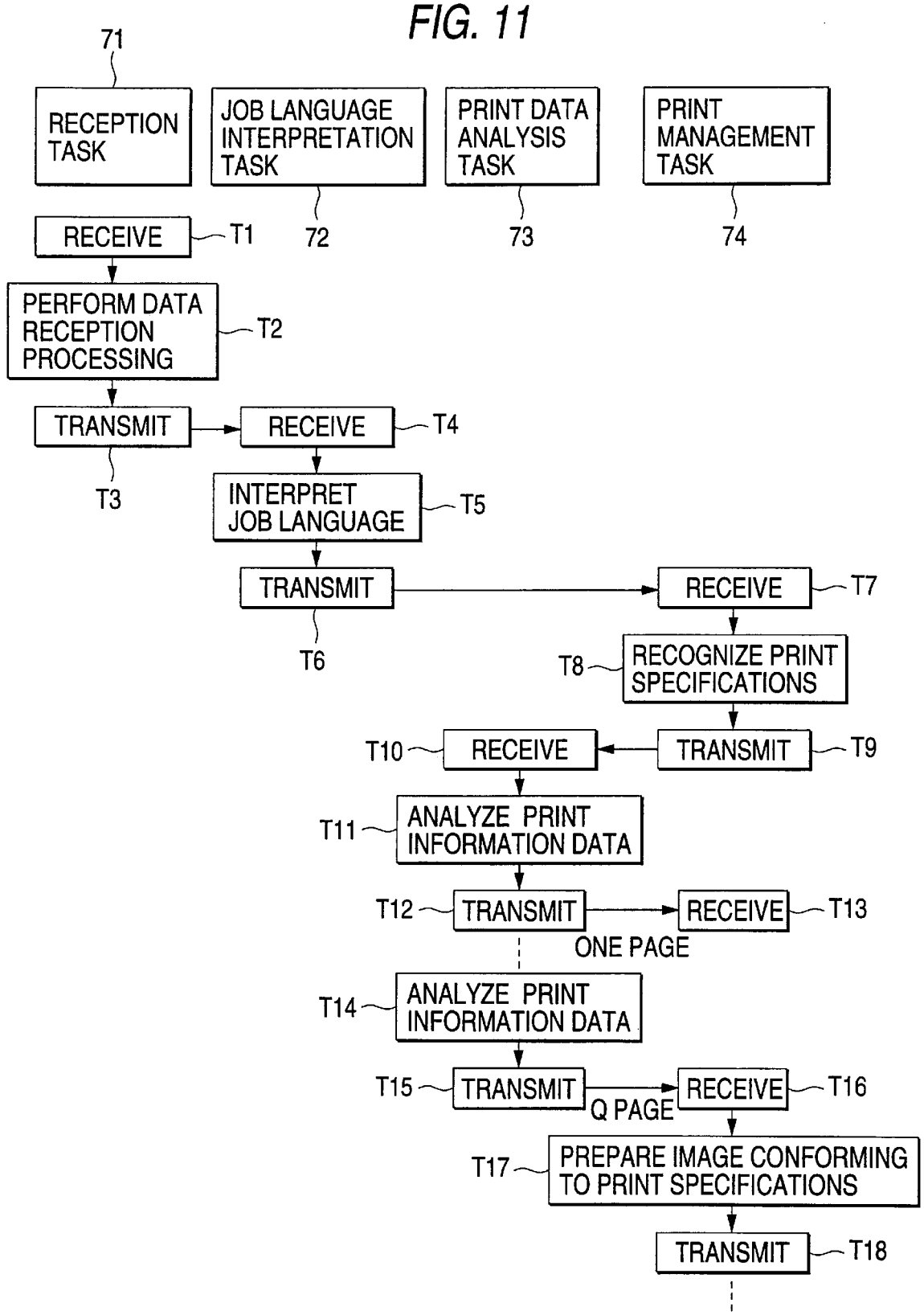
FIG. 11 is a chart to show an example of a process flow of the controller of the invention.

FIG. 10 shows functional blocks of the controller 7 to show print processing. FIG. 11 shows a process flow of the controller 7 from print information reception to print execution.

When data is transmitted from the host 1, first the reception task 71 starts processing upon reception of the data at step T1, performs data reception processing at step T2, and stores the received data in the reception buffer 83, then transmits data at step T3. Control is transferred to another task. The reception buffer 83 is formed in a RAM 44 and an auxiliary storage 45 such as a hard disk drive. A storage management task 81 determines which of the RAM 44 and the auxiliary storage 45 the data is to be stored in. It determines which of the RAM 44 and the auxiliary storage 45 the data is to be saved in so that the data can be saved and consumed most efficiently by considering the difference between the read time and the write time caused by the difference between the RAM 44 and the auxiliary storage 45, the print information transfer rate from the host, the print information processing (print information analysis to print execution) speed at the printer, and any other factors, as described above. For example, if print processing is delayed and data remains in the RAM 44 on a whole, some data is stored in the auxiliary storage 45 and then read into the RAM 44 as required, whereby both of the RAM 44 and the auxiliary storage 45 are used efficiently. Information concerning the storage locations of the data is written into a management table 82. The information in the management table 82 is transferred to the next task using the data. The storage management task 81 also manages the storage limit of the storage means as described above. If the storage means is about to reach the storage limit, the storage management task 81 informs, for example, the print management task 74 of the fact, as described above.

The job language interpretation task 72 starts processing at reception of the data at step T4 and interprets the job language of the data at step T5. If print specifications of reverse-order print, multiple-copy print, etc., are described in the portion written the job language, the job language interpretation task 72 sends the specification command to the print management task 74 at step T6. The print management task 74 recognizes the print specification at step T8 and transmits at step T9.

The print data analysis task 73 starts processing at reception at step TIO and converts print information into intermediate print information at step T11. Here, the task reads data stored in the reception buffer 83 based on the information in the management table 82, converts the data into intermediate print information, and stores the intermediate print information in the intermediate print information buffer 84. Like the reception buffer 83, the intermediate print information buffer 84 is formed in the RAM 44 and the auxiliary storage 45. The storage management task 81 determines on which of the RAM 44 and the auxiliary storage 45 the intermediate print information is to be stored. Information concerning the storage locations of the intermediate print information is written into the management table 82. Whenever 1-page intermediate print information is stored, the print data analysis task 73 sends the information to the print management task 74 at step T12. Upon reception of the information at step T13, the print management task 74 executes print one page at a time if normal print, namely, print in the transmitted print information order is executed; however, if print of a cluster of print information in the reverse order, for example, is specified, the print management task 74 delays print execution until information in which the intermediate print information of the last page is stored is received. The print data analysis task 73 analyzes the print information of the last page (Q page) at step T14 and transmits the analysis result at step T15. Then, upon reception of the analysis result at step T16, the print management task 74 executes print conforming to the print specifications at step T17. That is, it converts the intermediate print information matching the print specification of test print, reverse-order print, etc., into bit images in the specification order, and transmits at step 18.

Figure 12:
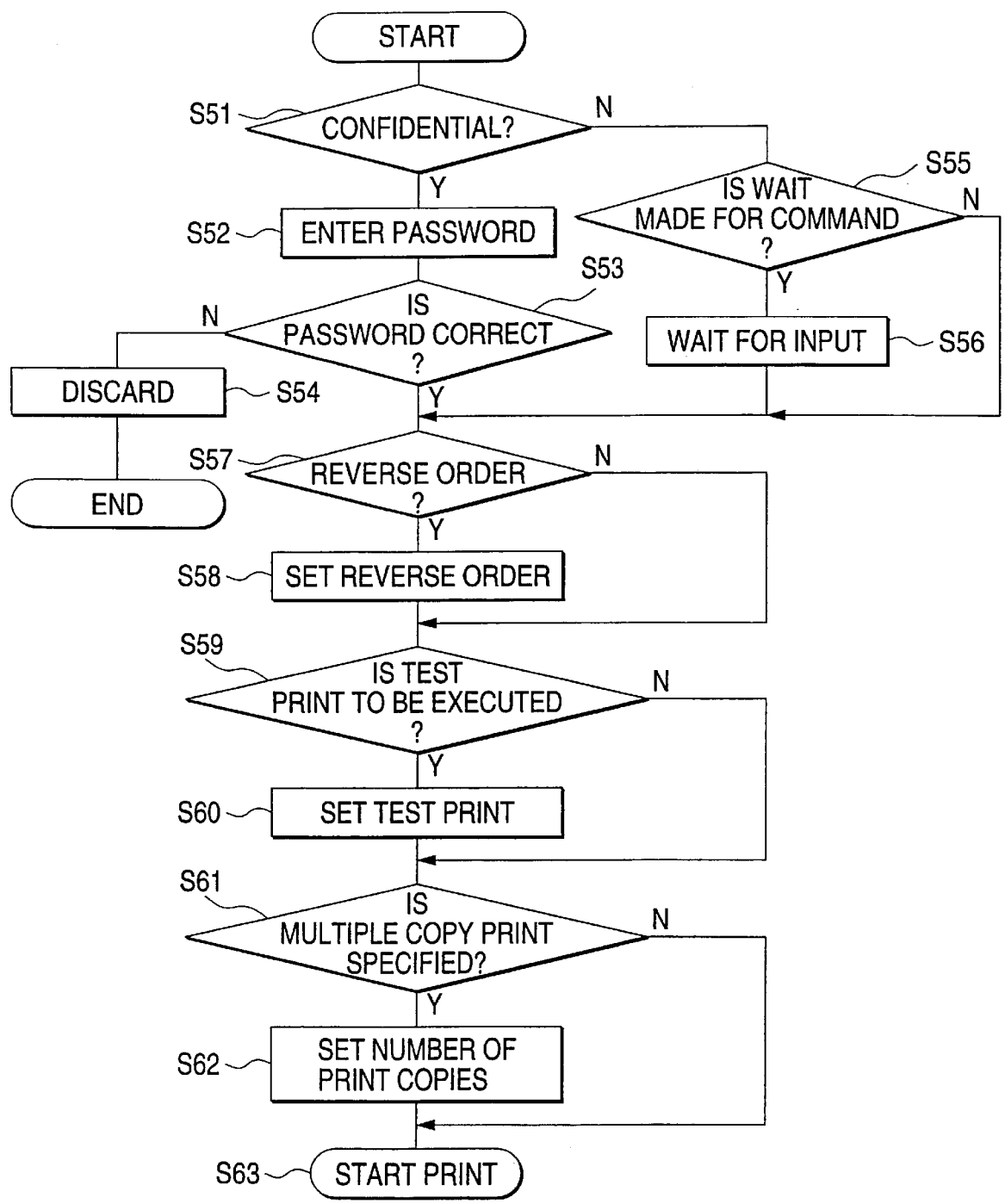
FIG. 12 is a flowchart to show a print processing flow of the invention.

FIG. 12 shows an example of a process flow of the print management task 74. Whether or not confidential print is specified is determined at step S51. If confidential print is specified, a wait is made for the user to enter a password. If a password is entered at step S52, whether or not the entered password is correct is determined at step S53. If the password is not correct, it is discarded at step S54 and the process is terminated. If confidential print is not specified at step S51, whether or not a command for a wait is made is determined at step S55. If a wait command print is specified, a wait is made for command input at step S56. After a command is input, control goes to step S57. If command wait print is not specified, control also goes to step S57. Whether or not reverse-order print is specified is determined at step S57. If reverse-order print is specified, the reverse order is set at step S58. Whether or not test print is to be executed is determined at step S59. If test print is to be executed, test print is set at step S60. Whether or not multiple-copy print is specified is determined at step S61. If multiple copy print is specified, the number of print copies is set at step S62, then print is started at step S63.

Figure 13:
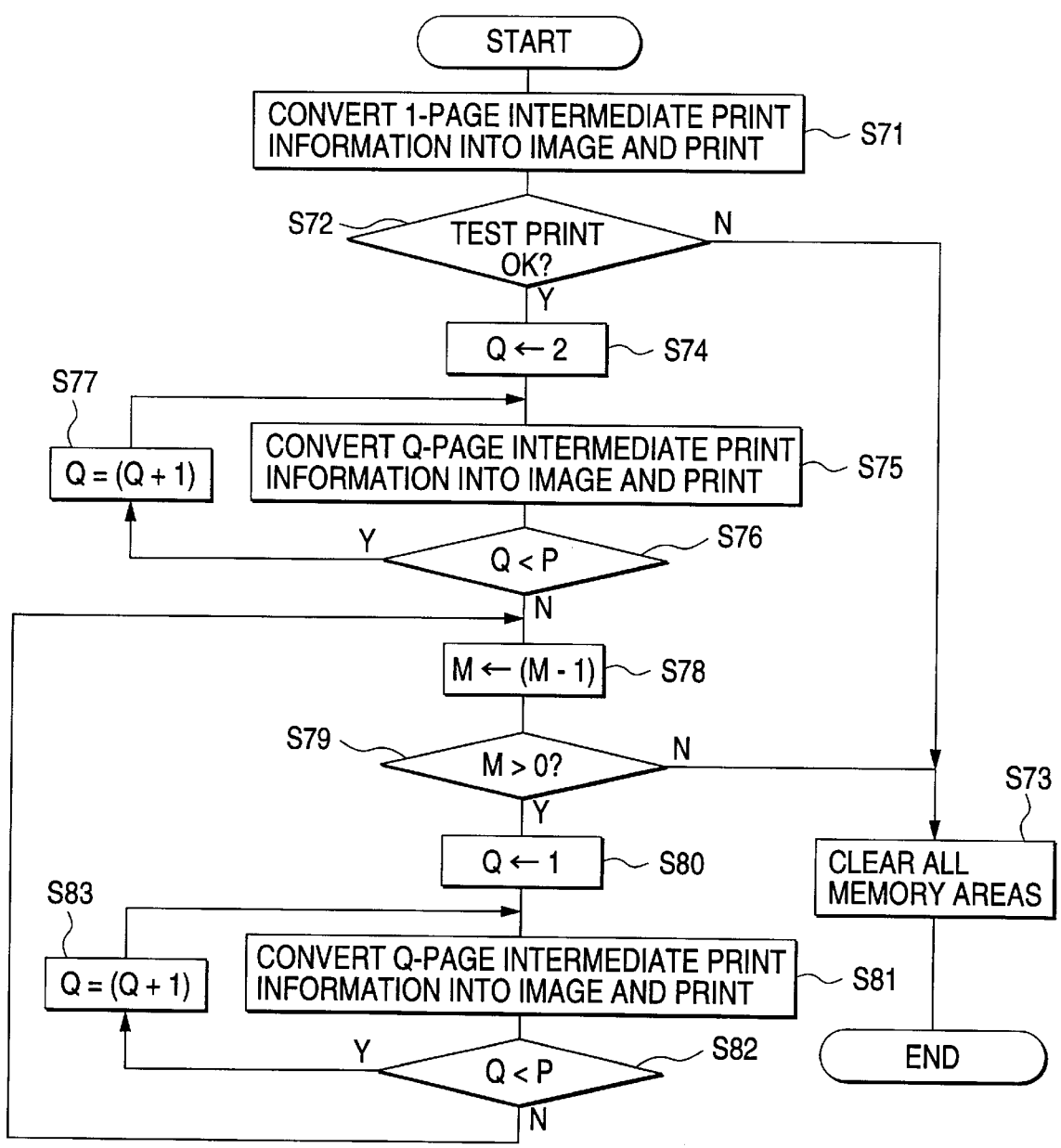
FIG. 13 is a flowchart to show a print processing flow of the invention.

FIG. 13 show a flow for test printing of only one page of P-page print information and then printing a total of M copies. When test print is set as described above, the print management task 74 converts the intermediate print information of the first page into an image and executes print at step S71. A wait is made for input indicating whether or not the test print is OK at step S72. If the test print is not OK, all the memory areas are cleared at step S73 and the print is terminated. If the test print is OK, print of the second page to the Pth page is executed at steps S74–S77. Next, the remaining (M−1) copies are printed at steps S78–S83. When all copies have been printed, control goes from step S79 to step S73. All memory areas are cleared and the process is terminated.

Figure 14:
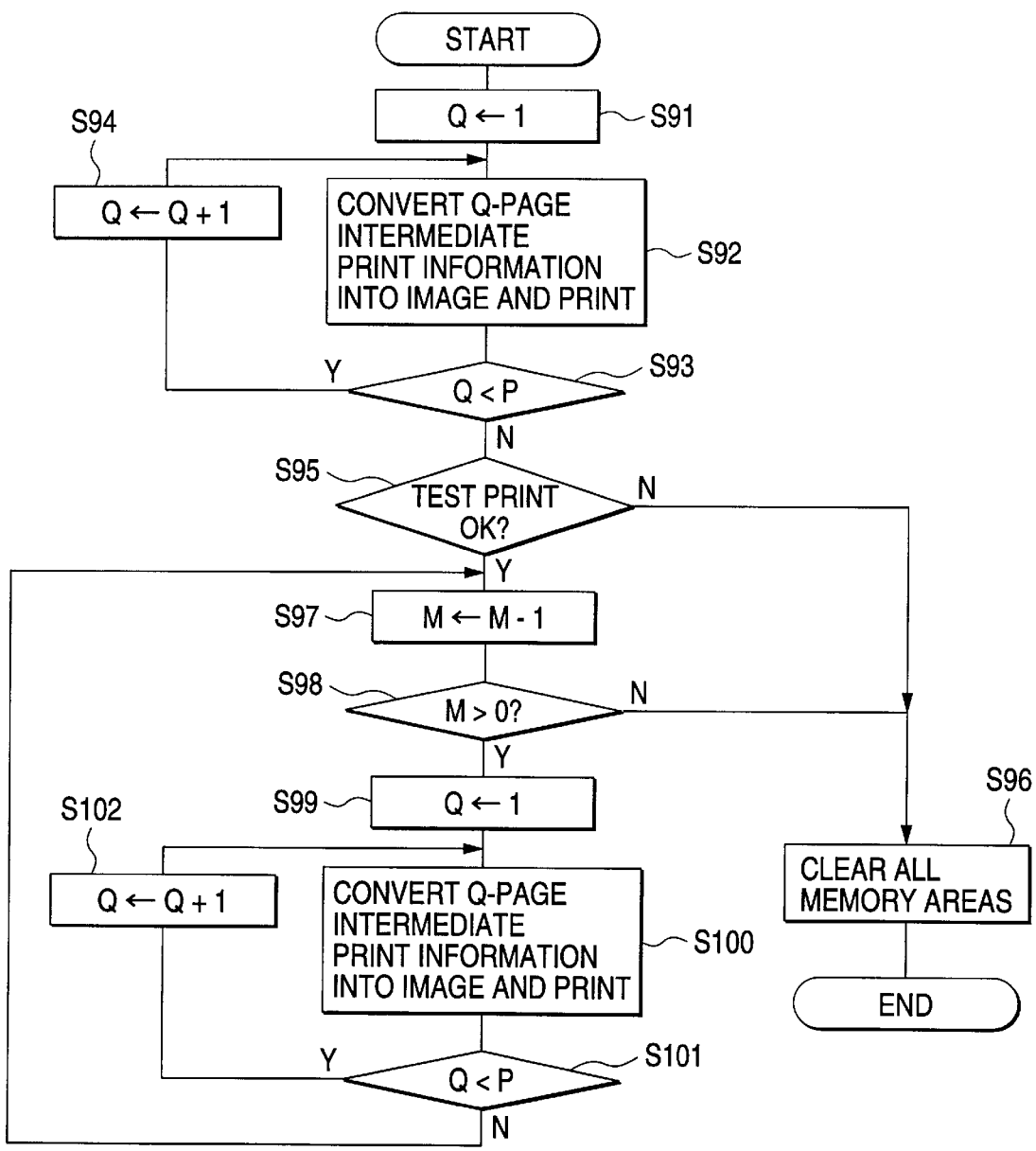
FIG. 14 is a flowchart to show a print processing flow of the invention.

FIG. 14 show a flow for test printing of one copy at the beginning before M copies of P-page print information are printed. First, one copy of P-page print information is printed at steps S91–S94 and a wait is made for input indicating whether or not the test print is OK at step S95. If the test print is not OK at step S95, all the memory areas are cleared at step S96 and the process is terminated. If the test print is OK, the remaining (M−1) copies are printed at steps S97–S102. When the remaining copies have been printed, control goes from step S98 to step S96. All memory areas are cleared and the process is terminated.

Figure 15:
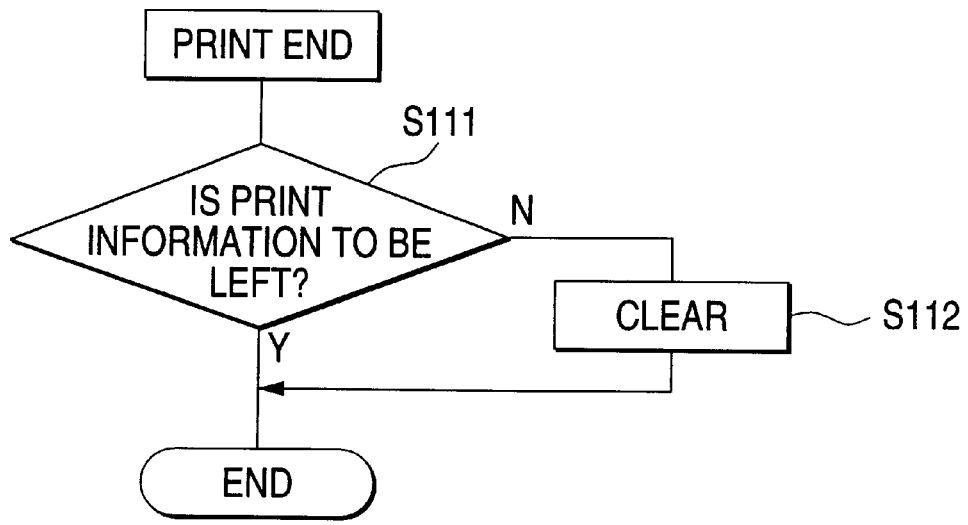
FIGS. 15(A) and 15(B) are flowcharts to show a print processing flow of the invention.
Figure 15:
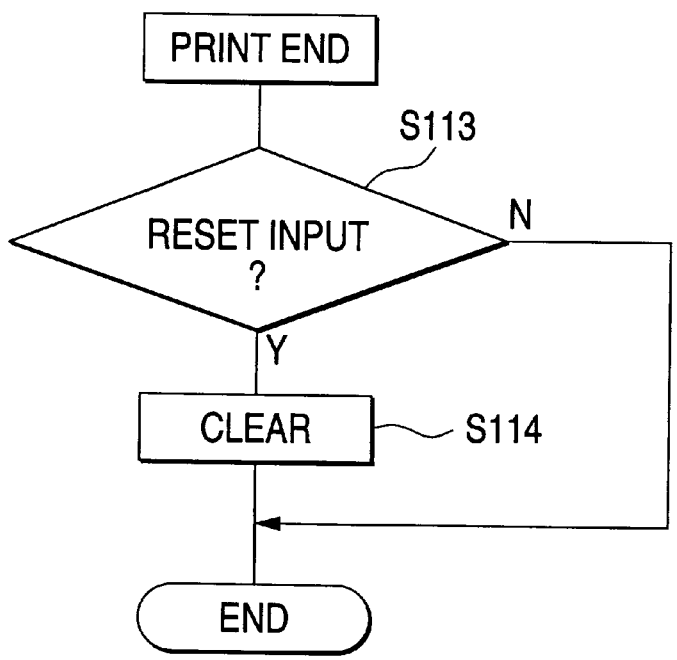

The examples of the print specifications we have discussed are representative examples; various print specifications are possible. For example, after print terminates, its print information may be saved. In this case, if the saved print information can be again printed later according to input through the printer panel, etc., the print time is shortened drastically. For example, it is convenient for repetitive form print, etc. Normally, after print terminates, intermediate print information left in the memory is cleared as a rule, but can also be saved unless otherwise specified. For example, as shown in FIG. 15(A), whether or not print information is to be left in memory can also be specified as at step S111 after the termination of print. The memory may be cleared at step S112 only when a clear command is entered. For such saved print information, for example, as shown in FIG. 15(B), the memory is cleared at step S114 according to reset input as at step S113 after the termination of print.

To save print information in such a manner, either the received print information or intermediate print information may be left in memory; for example, the received print information or intermediate print information, whichever is the smaller, can also be automatically selected and saved. The data in the RAM 44 to be saved can also be saved in the auxiliary storage 45 automatically.

We have discussed the invention by taking the laser printer as an example, but it is obvious that the invention can also be applied to every print system.

For connection to a network, the image information print method of the invention can be used by constructing a similar system on a printer server. That is, a storage can be easily provided by using RAM, hard disk, etc., of the specified server in combination and if the controller of the printer server performs control similar to that in the invention, a print can be provided in the correct order from a desired tray of a desired printer.

The image information print system can also be applied to both-sided printing easily, needless to say.

Effects of the Invention

According to the invention, a printer is provided with a large-capacity auxiliary storage, whereby various print specifications can be easily selected and print can be executed in various forms without the need for operation from the host computer.

For example, even to execute copy print of more than one copy of more than one page, the host needs to send print information to the printer only once, so that the communication time with the host can be shortened, resulting in shortening of the host release time, enabling the operator to start another job earlier than was previously possible. Since the print information reception time from the host can be omitted, the image information print system can print in a short time for making multiple copies.

The image information print system of the invention can flexibly deal with furthermore complicated copying, such as making M copies of a print consisting of Na, Nb, Nc, . . . , Nx pages and can also be used to print one copy of print information of pages 1 to N as previously used.

According to the invention, an expensive and large sorter paper discharge unit can be made unnecessary, thus the image information print system can be made inexpensive and small. If an offset paper discharge unit is used, the limit on the number of physical trays in a sorter is eliminated, thus the number of copies is not limited.

According to the invention, even if the storage has an insufficient capacity, intricate work of the operator such as page sorting of print recording media can be minimized.

What is claimed is:

1. An image information print system comprising:
    means for receiving job data containing print information input from a host computer;
    job language interpretation means for interpreting the job data;
    format conversion means for converting a format of the print information to prepare intermediate print information;
    means for storing one of the job data not subjected to format conversion for preparing the intermediate print information and the intermediate print information;
    print management means for issuing a print execution instruction based on a desired print specification selected from a group including confidential print, command wait print, test print, reverse-order print, multiple-copy print and save after print;
    print execution means for converting the intermediate print information into bit image data and executing printing based on the print execution instruction of said print management means; and
    paper discharge face specification means for specifying face-down or face-up paper discharge, wherein said print management means detects information indicating face-down or face-up paper discharge provided by said paper discharge face specification means before reception of print information from the host computer and converts the intermediate print information into bit image data in desired units without waiting for a cluster of intermediate print information to be stored in said storage means if conversion processing is performed in a print reception order in response to the paper discharge face information.

2. The image information print system according to claim 1, wherein said print management means determines in sequential order of confidential print, command wait print, multiple-copy print, and save after print, whether or not a print specification request corresponding thereto is made.

3. The image information print system according to claim 1, wherein said desired print specification can be specified for saved intermediate print information from the host computer.

4. The image information print system according to claim 1, further including input means through which the desired print specification can be specified for saved intermediate print information.

5. The image information print system according to claim 1, wherein said storage means has a RAM and auxiliary storage means, and said image information print system further includes storage management means for determining which of said RAM and said auxiliary storage means the data and intermediate print information are to be stored in.

6. An image information print system comprising:
    means for receiving job data containing print information input from a host computer;
    job language interpretation means for interpreting the job data;
    format conversion means for converting a format of the print information to prepare intermediate print information;
    means for storing one of the job data not subjected to format conversion for preparing the intermediate print information and the intermediate print information;
    print management means for issuing a print execution instruction based on a desired print specification selected from a group including confidential print, command wait print, test print, reverse-order print multiple-copy print and save after print;
    print execution means for converting the intermediate print information into bit image data and executing printing based on the print execution instruction of said print management means; and
    capacity limit recognition means for determining whether said intermediate print information stored in said storage means exceeds a predetermined capacity, setting a cluster of intermediate print information, instructing print execution and informing said print management means that intermediate print information stored in said storage means exceeds a predetermined capacity, wherein while data containing print information is being received at said reception means, if intermediate print information prepared from the print information stored in said storage means exceeds said predetermined capacity, said capacity limit recognition means sets the intermediate print information stored before the intermediate print information exceeds the predetermined capacity as a cluster of intermediate print information, instructs said print execution means to execute printing and informs said print management means that the predetermined capacity has been exceeded.

7. The image information print system according to claim 6, wherein the predetermined capacity of said capacity limit recognition means is a storage capacity limit of said storage means.

8. The image information print system according to claim 1, wherein said job language interpretation means detects a first start job command and a last end job command from the job data and recognizes print information sandwiched between the start and end job commands as a cluster of print information.

9. The image information print system according to claim 1, further including paper discharge face specification means for specifying face-down or face-up paper discharge, wherein said print management means determines a conversion processing procedure of the intermediate print information stored in said storage means into bit image data so that a print provided as a result of printing is sorted in a desired page order in response to paper discharge face information provided by said paper discharge face specification means.

10. An image information print method comprising the steps of:

receiving data containing print information input from a host computer;

interpreting the data, said interpreting step comprising the steps of detecting a first start job command and a last end job command from said data and recognizing print information sandwiched between the start and end job commands as a cluster of print information;

converting a format of the print information to prepare intermediate print information;

specifying face-down or face-up paper discharge before reception of print information from the host computer and converting the intermediate print information into bit image data in desired units without waiting for a cluster of intermediate print information to be stored if conversion processing is performed in a print reception order in response to the paper discharge face information;

issuing a print execution instruction based on a desired print specification; and executing printing based on the issued print execution instruction.

11. The image information print method according to claim 10, wherein in an order of confidential print, command wait print, multiple-copy print, and save after print, whether or not a print specification request corresponding thereto is made is determined.

12. A storage medium executable with a host computer for driving an image information print system, wherein the image information print system stores a program for receiving data containing print information input form the host computer, interprets the data, converts a format of the print information to prepare intermediate print information, stores the intermediate print information in storage means thereof, and executes a desired print specification, said interpreting step comprising the steps of detecting a first start job command and a last end job command from said data and recognizing print information sandwiched between the start and end job commands as a cluster of print information and said storage medium having a program code recorded thereon, said program code comprising:

means for making the image information print system interpret the print specification based on at least one of a command contained in the data and a command entered separately from the data;

means for making the image information print system specify face-down or face-up paper discharge before reception of print information from the host computer and converting the intermediate print information into bit image data in desired units without waiting for a cluster of intermediate print information to be stored if conversion processing is performed in a print reception order in response to the paper discharge face information; and means for making the image information print system execute printing based on the print specification.

13. The storage medium according to any claim 12, wherein said program determines in an order of confidential print, command wait print, multiple-copy print, and save after print, whether or not a print specification request corresponding thereto is made.

14. An image information print system comprising:

means for receiving job data containing print information input from a host computer;

job language interpretation means for interpreting the job data;

format conversion means for converting a format of the print information to prepare intermediate print information;

means for storing one of the job data not subjected to format conversion for preparing the intermediate print information and the intermediate print information;

print management means for issuing a print execution instruction based on a desired print specification selected from a group including confidential print, command wait print, test print, reverse-order print, multiple-copy print and save after print;

print execution means for converting the intermediate print information into bit image data and executing printing based on the print execution instruction of said print management means; and paper discharge face specification means for specifying face-down or face-up paper discharge, wherein said print management means detects information indicating face-down or face-up paper discharge provided by said paper discharge face specification means before reception of print information from the host computer and waits for a cluster of intermediate print information to be stored in said storage means before starting conversion of intermediate print information into bit image data if the intermediate print information is converted into bit image data in an order reverse to the print information reception order.

15. An image information print system comprising:

means for receiving job data containing print information input from a host computer;

job language interpretation means for interpreting the job data;

format conversion means for converting a format of the print information to prepare intermediate print information;

means for storing one of the job data not subjected to format conversion for preparing the intermediate print information and the intermediate print information;

print management means for issuing a print execution instruction based on a desired print specification selected from a group including confidential print, command wait print, test print, reverse-order print, multiple-copy print and save after print;

print execution means for converting the intermediate print information into bit image data and executing printing based on the print execution instruction of said print management means; and paper discharge face specification means for specifying face-down or face-up paper discharge, wherein said print management means detects information indicating face-down or face-up paper discharge provided by said paper discharge face specification means before reception of print information from the host computer and converts the intermediate print information into bit image data in desired units without waiting for a cluster of intermediate print information to be stored in said storage means if conversion processing is performed in a print reception order in response to the paper discharge face information, or waits for a cluster of intermediate print information to be stored in said storage means before starting conversion of intermediate print information into bit image data if the intermediate print information is converted into bit image data in an order reverse to the print information reception order.

16. An image information print method comprising the steps of:

receiving data containing print information input from a host computer;

interpreting the data, said interpreting step comprising the steps of detecting a first start job command and a last end job command from said data and recognizing print information sandwiched between the start and end job commands as a cluster of print information;

specifying face-down or face-up paper discharge before reception of print information from the host computer and waiting for a cluster of intermediate print information to be stored before starting conversion of intermediate print information into bit image data if the intermediate print information is converted into bit image data in an order reverse to the print information reception order;

issuing a print execution instruction based on a desired print specification; and executing printing based on the issued print execution instruction.

17. An image information print method comprising the steps of:

receiving data containing print information input from a host computer;

interpreting the data, said interpreting step comprising the steps of detecting a first start job command and a last end job command from said data and recognizing print information sandwiched between the start and end job commands as a cluster of print information;

specifying face-down or face-up paper discharge before reception of print information from the host computer and converting the intermediate print information into bit image data in desired units without waiting for a cluster of intermediate print information to be stored if conversion processing is performed in a print reception order in response to the paper discharge face information, or waiting for a cluster of intermediate print information to be stored before starting conversion of intermediate print information into bit image data if the intermediate print information is converted into bit image data in an order reverse to the print information reception order;

issuing a print execution instruction based on a desired print specification; and executing printing based on the issued print execution instruction.

18. A storage medium executable with a host computer for driving an image information print system, wherein the image information print system stores a program for receiving data containing print information input form the host computer, interprets the data, converts a format of the print information to prepare intermediate print information, stores the intermediate print information in storage means thereof, and executes a desired print specification, said interpreting step comprising the steps of detecting a first start job command and a last end job command from said data and recognizing print information sandwiched between the start and end job commands as a cluster of print information and said storage medium having a program code recorded thereon, said program code comprising:

means for making the image information print system interpret the print specification based on at least one of a command contained in the data and a command entered separately from the data;

means for making the image information print system specify face-down or face-up paper discharge before reception of print information from the host computer and waiting for a cluster of intermediate print information to be stored before starting conversion of intermediate print information into bit image data if the intermediate print information is converted into bit image data in an order reverse to the print information reception order; and means for making the image information print system execute printing based on the print specification.

19. A storage medium executable with a host computer for driving an image information print system, wherein the image information print system stores a program for receiving data containing print information input form the host computer, interprets the data, converts a format of the print information to prepare intermediate print information, stores the intermediate print information in storage means thereof, and executes a desired print specification, said interpreting step comprising the steps of detecting a first start job command and a last end job command from said data and recognizing print information sandwiched between the start and end job commands as a cluster of print information and said storage medium having a program code recorded thereon, said program code comprising:

means for making the image information print system interpret the print specification based on at least one of a command contained in the data and a command entered separately from the data;

means for making the image information print system specify face-down or face-up paper discharge before reception of print information from the host computer and converting the intermediate print information into bit image data in desired units without waiting for a cluster of intermediate print information to be stored if conversion processing is performed in a print reception order in response to the paper discharge face information, or waiting for a cluster of intermediate print information to be stored before starting conversion of intermediate print information into bit image data if the intermediate print information is converted into bit image data in an order reverse to the print information reception order; and means for making the image information print system execute printing based on the print specification.

* * * * *